(12) United States Patent
Lange (10) Patent No.: US 6,862,142 B2
(45) Date of Patent: Mar. 1, 2005

(54) MULTI-DETECTOR MICROSCOPIC INSPECTION SYSTEM

(75) Inventor: Steven R. Lange, Alamo, CA (US)

(73) Assignee: KLA-Tencor Technologies Corporation, Milpitas, CA (US)

(*) Notice: Subject to any disclaimer, the term of this patent is extended or adjusted under 35 U.S.C. 154(b) by 0 days.

(21) Appl. No.: 10/072,469

(22) Filed: Feb. 6, 2002

(65) Prior Publication Data

US 2004/0027688 A1 Feb. 12, 2004

Related U.S. Application Data

(63) Continuation-in-part of application No. 09/602,920, filed on Jun. 23, 2000, now Pat. No. 6,362,923.
(60) Provisional application No. 60/188,309, filed on Mar. 10, 2000.

(51) Int. Cl.[7] .................. G02B 15/14; G02B 27/40; G01N 23/00; G06K 9/00
(52) U.S. Cl. .................. 359/689; 250/201.2; 250/201.3; 250/306; 250/307; 250/310; 382/128
(58) Field of Search .................. 359/639, 618, 359/645, 661, 689, 351, 354, 355, 356, 357, 364, 365, 366, 368, 385, 726, 802; 250/306, 307, 310, 311, 201.2, 201.3, 492.1; 356/237.4; 382/128

(56) References Cited

U.S. PATENT DOCUMENTS

| | | | |
|---|---|---|---|
| 4,845,552 A | * 7/1989 | Jaggi et al. | 382/128 |
| 5,004,331 A | 4/1991 | Haseltine et al. | 359/728 |
| 5,031,976 A | 7/1991 | Shafer et al. | 359/355 |
| 5,051,585 A | * 9/1991 | Koshishiba et al. | 250/306 |
| 5,089,910 A | 2/1992 | Sigler | 359/357 |
| 5,114,238 A | 5/1992 | Sigler | 359/357 |
| 5,717,518 A | 2/1998 | Shafer et al. | 359/357 |
| 5,940,222 A | 8/1999 | Sinclair et al. | 359/689 |
| 5,956,174 A | 9/1999 | Shafer et al. | 359/357 |
| 5,999,310 A | 12/1999 | Shafer et al. | 359/351 |
| 6,020,957 A | 2/2000 | Rosengaus et al. | 356/237.4 |
| 6,172,349 B1 | * 1/2001 | Katz et al. | 250/201.3 |
| 6,215,587 B1 | 4/2001 | Alfano et al. | 359/368 |
| 6,362,923 B1 | 3/2002 | Lange et al. | 359/689 |
| 6,476,388 B1 | * 11/2002 | Nakagaki et al. | 250/310 |
| 6,693,664 B2 | 2/2004 | Neumann | 348/126 |

* cited by examiner

Primary Examiner—Loha Ben
(74) Attorney, Agent, or Firm—Beyer Weaver & Thomas LLP (57) ABSTRACT

Techniques for utilizing a microscope inspection system capable of inspecting specimens at high throughput rates are described. The inspection system achieves the higher throughput rates by utilizing more than one detector array and a large field of view to scan the surface of the semiconductor wafers. The microscope inspection system also has high magnification capabilities, a high numerical aperture, and a large field of view. By using more than one detector array, more surface area of a wafer can be inspected during each scanning swath across the semiconductor wafers. The microscope inspection system is configured to have a larger field of view so that the multiple detector arrays can be properly utilized. Additionally, special arrangements of reflective and/or refractive surfaces are used in order to fit the detector arrays within the physical constraints of the inspection system.

49 Claims, 4 Drawing Sheets

MULTI-DETECTOR MICROSCOPIC INSPECTION SYSTEM

CROSS-REFERENCE TO RELATED APPLICATIONS

This application is a continuation-in-part of U.S. patent application Ser. No. 09/602,920, now U.S. Pat. No. 6,362,923 B1, filed Jun. 23, 2000, entitled "Lens For Microscopic Inspection," which claims priority of U.S. provisional patent application No. 60/188,309, filed Mar. 10, 2000, entitled "IMPROVED LENS FOR MICROSCOPIC INSPECTION," which is hereby incorporated by reference.

FIELD OF THE INVENTION

The present invention relates generally to microscopic inspection systems, and more specifically to microscopic inspection systems that utilize multiple detector arrays.

BACKGROUND OF THE INVENTION

Semiconductor manufacturing involves highly complex techniques for integrating circuits into semiconductor materials. Due to the large number of processing steps and the decreasing size of semiconductor devices, the semiconductor manufacturing process is prone to processing defects that decrease device yields. Inspection procedures used to detect and eliminate these processing defects from the processing steps are therefore critical for maintaining high yielding production processes. Since the inspection procedures are an integral and significant part of the manufacturing process, the semiconductor industry constantly seeks more accurate and efficient inspection techniques.

Currently, typical microscopic inspection systems utilize a single detector array to inspect semiconductor wafers. The detector arrays may contain a variety of sensor-element (pixel) densities. For example, detector arrays having a 2048×512 array of pixels are available. To inspect a wafer, a detector array is typically raster scanned over the patterned wafer's surface under high magnification. Unfortunately, scanning wafers line-by-line is time consuming, especially when the time required for changing the relative directions of the detector arrays over the wafer is taken into account. Typically, the wafer is attached to an x,y stage and driven under the microscope. During a swath across the wafer, the stage must accelerate to a constant speed, scan the swath of patterned surface to be inspected, decelerate to a stop, move up one field of view in the transverse direction, and accelerate to the constant velocity again for another swath. The overhead of non-swathing the patterned surface can be a significant fraction of the total wafer inspection time. For example, a magnification of 100× with a 20 um sized pixel and 2048 detector elements would produce a scan width of 0.41 mm and would require 732 swaths to cover a standard 300 mm diameter semiconductor wafer. If overhead of each swath were 1 second, then the inspection time would be extended by over 12 minutes for each wafer. Therefore, microscopic inspection of wafers reduces the throughput of semiconductor manufacturing. One possible solution is to create larger sized detector arrays such that fewer scanning passes of the detector array over the wafer are required. Unfortunately, larger detector arrays with no defective pixels are very difficult to fabricate because yields are small with physically large devices. Another possible solution is to run the current detectors at higher speeds. However, it is difficult to obtain much improvement from the current state-of-the-art using this strategy because the detectors create a greater amount of noise at higher speeds, thereby diminishing the signal-to-noise ratio. This would also not help the scanning overhead time.

In view of the foregoing, a microscopic inspection system that is able to operate at higher speeds such that higher manufacturing throughputs can be achieved, would be desirable.

BRIEF SUMMARY OF THE INVENTION

The present invention pertains to a microscope inspection system capable of inspecting specimens at high throughput rates. The inspection system achieves the higher throughput rates by utilizing more than one detector array and a large field of view to scan the surface of the semiconductor wafers. The microscope inspection system also has high magnification capabilities, a high numerical aperture, and a large field of view. By using more than one detector array, more surface area of a wafer can be inspected during each scanning swath over the semiconductor wafers thereby minimizing the swathing overhead time and making the system more efficient. The microscope inspection system is configured to have a larger field of view so that the multiple detector arrays can be properly utilized. Additionally, special arrangements of reflective and/or refractive surfaces are used in order to fit the detector arrays within the physical constraints of the inspection system.

One aspect of the present invention pertains to a microscope inspection system for inspecting a specimen that includes an objective lens configured to have a high magnification, a high numerical aperture, and a large field of view, a first end of the objective lens positioned proximate to the specimen, and more than one detector array positioned substantially within the field of view of the objective lens. In another aspect of the present invention, the objective lens is a catadioptric lens. In another aspect of the invention, a reimaging lens and a zoom lens can be used together with the objective lens. In yet another aspect of the invention, a reflective element is utilized with the inspection system so to re-direct the path of light rays so that they reach the detector arrays.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described with reference to a few preferred embodiments thereof as illustrated in the accompanying drawings. In the following description, numerous specific details are set forth in order to provide a thorough understanding of the present invention. It will be apparent, however, to one skilled-in-the-art, that the present invention may be practiced without some or all of these specific details. In other instances, well-known operations have not been described in detail so not to unnecessarily obscure the present invention.

To begin with, an overview of the present invention will now be provided. The present invention pertains to a semiconductor inspection system capable of operating at high throughput rates. Generally, the inspection system achieves the higher throughput rates by utilizing more than one detector array and a large field of view to scan the surface of the semiconductor wafers. By using more than one detector array, more surface area of a wafer can be inspected during each scanning swath of the semiconductor wafers. The microscope inspection system is configured to have a larger field of view so that the multiple detector arrays can be properly utilized. Additionally, special arrangements of reflective and/or refractive surfaces are used in order to fit the detector arrays within the physical constraints of the inspection system. In alternative embodiments, the inspection system can be used to inspect specimens other than semiconductor wafers.

Figure 1:
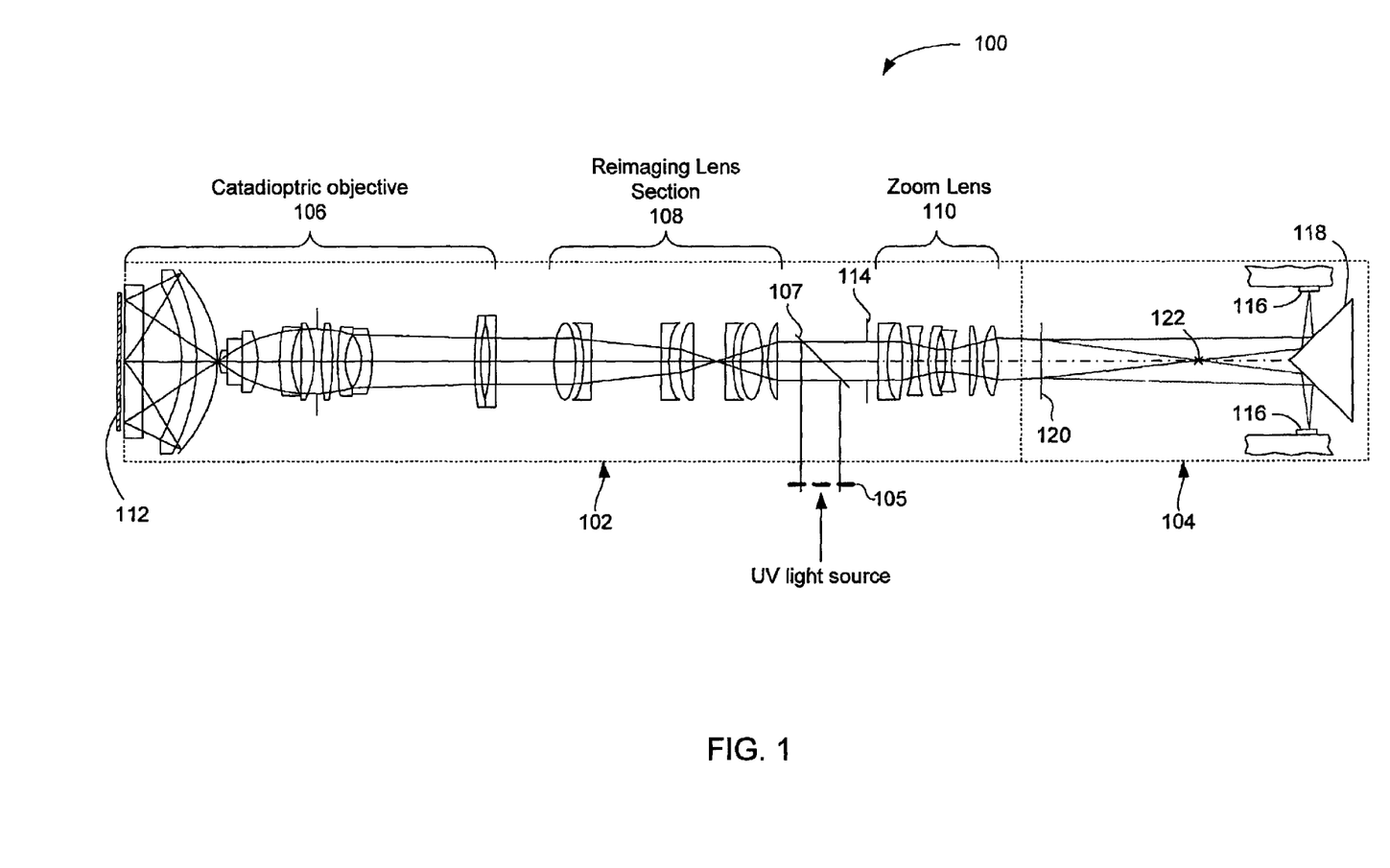
FIG. 1 illustrates a diagrammatic representation of the optical element layout of a microscope inspection system according to one embodiment of the present invention.

FIG. 1 is now described to provide a more detailed understanding of one embodiment of the present invention. FIG. 1 illustrates a diagrammatic representation of the optical element layout in a microscope inspection system 100 according to one embodiment of the present invention. Microscope inspection system 100 includes a lens section 102 and a detector section 104. The rectangular dotted-line boxes designate the lens and detector sections 102 and 104. Lens section or space 102 can contain various combinations of lenses for implementing the present invention. Detector section 104 can contain various combinations of detector arrays and reflective devices for implementing the invention. Lens section 102 includes a catadioptric objective lens 106, a reimaging lens 108, and a zoom lens 110. Each of the lenses 106, 108 and 110 are actually formed from a combination of individual lenses. Catadioptric objective lens 106 is placed proximate to specimen 112 to be inspected. Catadioptric objective lens 106 can be configured to have relatively large fields of view, which can accommodate multiple detector arrays. The specimen can be a variety of objects that may need to be inspected at the microscopic level. However, the present invention is likely to be tailored to inspect semiconductor wafers.

Microscope inspection system 100 operates by introducing light into lens section 102 through illumination pupil 105, after which, beamsplitter 107 directs the light through the various lenses and towards specimen 112. After bouncing off specimen 112, the light rays return through the various lenses and towards exit pupil 120. The light rays pass through exit pupil 120 and then at split point 122, the light rays separate into separate bundles of light. Each of the bundles of light are then re-directed towards detector arrays 116 by a reflective element 118. In alternative embodiments of the invention, the lenses can be configured such that more than two bundles of light separate from each other after split point 122.

The light source used for the microscope inspection system can be a broadband arc lamp, a continuous wave laser or a pulsed laser, which emits periodic rapid bursts of light in which the detection can be synchronized to the movement of the wafer relative to the field of view.

In order to utilize more than one detector array in the present invention, the field of view of microscope inspection system 100 is large enough to encompass more than one detector array 116. Some embodiments of inspection system 100 use lenses that create fields of view that can be up to approximately 3 mm in diameter at the object. Depending upon physical and cost limitations, even larger fields of view can be created. In the embodiment of FIG. 1, the large field of view over a broad spectral range is a result of using a catadioptric objective lens 106 in combination with a reimaging lens 108. As will be described later, various combinations of lenses can be used to obtain a large field of view required to implement the present invention. Zoom lens 110 is used to vary the magnification power of inspection system 100. As a note, the field of view for current semiconductor inspection systems ranges from 100–500 $\mu$m, depending upon the magnification.

Depending upon the magnification power of inspection system 100, many more than one detector array can typically fit within the field of view. Generally, more detector arrays can fit within a field of view as the magnification of the inspection system is increased. The inspection system can use a variety of detector arrays, one of which is a Time Delay Integration (TDI) CCD detector. Typically, standard TDI CCD detector arrays have a 2048×512 array of pixels wherein each pixel is approximately 0.020 mm in size. The throughput of the inspection system is affected by the magnified size of each pixel at the object. For example, if the maximum field of view of the optical system is 1.6 mm at the object, then at a magnification of 25×, one detector array would fill the field of view. However, as the magnification increased to 50×, then 2 detector arrays could be used, at 150×, 6 detector arrays could be used, at 300×, 12 detector arrays could be used, and so forth. To determine the time it takes to scan a 300 mm diameter wafer, one can first calculate the number of pixel elements on the wafer and divide by the data rate of the detector(s). For example, a 300 mm diameter wafer would have ~4×10$^{12}$ pixels ({300/2]$^{2}$*pi/[0.000133]$^{2}$=4×10$^{12}$) at the 150× magnification (0.02 mm/150×=0.000133 mm size of de-magnified pixel). If the data rate from the detector were 500,000,000 pixels per second, then it would take about 8000 seconds (133 Min.) (4×10$^{12}$/5×10$^{8}$=8×10$^{3}$) just to process the data for a typical wafer-inspection system having a small field of view (0.27 mm). If the field of view could accommodate 6 detector arrays (1.64 mm), then the data processing time would shrink to 1325 sec (22 Min.). The swath overhead time would also decrease from the 1099 swaths (300 mm wafer diameter/(2048 pixels*0.000133 mm/pixel) for a 1-detector array inspection compared with only 183 swaths for a 6-detector array inspection system. It should be noted that an exactly integral number of detector arrays is not required to fit in the field of view. Detector arrays are read out in a column basis and one can select only those columns to use that fit into the field of view. As the size of each pixel decreases, the resolution and amount of collected information increases, which thereby decreases the throughput of the inspection system because more data processing is required. However, detector arrays with smaller pixel sizes allow an inspection system to have greater sensitivity.

The objective lens used by the present invention can be of a variety of lens types. Two types of objective lens are catadioptric objective lenses, which include a combination of reflective and refractive lens surfaces, and lithographic lenses, which includes only refractive lenses. Catadioptric objective lenses with two or more glass types in the refractive lenses can operate within a large spectrum of light wavelengths. Catadioptric objective lens, by themselves, can create a field of view of approximately up to 1.5 mm or greater. In combination with other lens, for example, lenses 108 and 110 of FIG. 1, the field of view for the entire inspection system can be made to be much larger. On the other hand, lithographic lenses are typically made completely from a single type of glass. Lithographic objective lenses typically can be made to have large fields of view and to have numerical apertures in the range of 0.6–0.7. Lithographic lenses have a narrower-operational wavelength bandwidth and are more expensive than typical catadioptric objective lenses for inspection.

Reimaging lens 108 acts to reimage or recreate an image of the system pupil outside of the objective lens 106, which is where the system pupil is generally located. The reimaged system pupil is located in pupil plane 114, which lies between reimaging lens 108 and zoom lens 110. Reimaging lens 108, together with a catadioptric objective lens, can create fields of view that are larger than what the catadioptric objective lens can create on its own. The reimaging of the pupil provides for flexibility in designing the objective lens so that the overall microscope inspection system can have larger fields of view and larger numerical apertures. Reimaging lens 108 can also be referred to as a pupil relay lens section.

Zoom lens 110 provides the ability to adjust the magnification of the system. For example, the level of magnification can be varied between 50× and higher levels. The magnification of the zoom lens can be used to control the number of detector arrays that fit within the field of view of the inspection system. Generally, individual detector arrays appear smaller within the field of view at higher magnification levels. Therefore, more detector arrays fit within the field of view at higher magnifications.

The inspection system of the present invention operates effectively when the lenses are designed to have a high numerical aperture, a large magnification, and a large field of view. A large numerical aperture is desirable because it provides the inspection system with high-resolution capabilities and hence more sensitivity. The inspection system of the present invention has a numerical aperture that depends on the detector pixel size, magnification, effective wavelength, and the detector pixel sampling of the optical resolution. Typically, a minimum of 2.5 detector pixels is needed to sample a resolution element. The resolution element is defined by the effective wavelength of the illumination divided by the numerical aperture. For example, if the magnification were 40× and the detector pixel element were 0.020 mm, then, at the object, the detector element would be de-magnified to 0.0005 mm, the resolution element would be 0.000125 (2.5*0.0005), and the required NA for proper sampling would be 0.43 for a wavelength of 0.000532 mm (0.000532/[0.00125]=0.43). At higher magnification, the specimen will be examined more closely and this also allows a larger number of detector arrays to be utilized by the inspection system.

Typically, to gain the highest sensitivity, the systems are operated with lower wavelengths and higher magnification and sometimes with more than 2.5 detector pixels per resolution element. For example, operating at 100× magnification requires the numerical aperture to be about 0.70 for a wavelength of 0.000365 mm, but when operating at 200× will require a numerical aperture of 0.90 at 0.000365 mm wavelength, but will over-sample the image with about 4.05 pixels/resolution element. This over-sampling results from not being able to have a numerical aperture larger than 0.90 to control optical aberrations. Generally, the numerical aperture and the magnification of microscope inspection systems increase or decrease proportionally with respect to each other within the range of possible lens solutions. The field of view, however, tends to be inversely proportional to the numerical aperture and the magnification again within the range of possible lens solutions. The lenses of the present invention, however, are capable of obtaining a large field of view while also having a high numerical aperture at high magnification levels. The large field of view, as mentioned above, allows the inspection system to inspect a larger area of the specimen during each scanning swath. To effectively use multiple detector arrays, the field of view of the inspection system is in the range of approximately 0.5 mm–3 mm. Usually, the field of view is configured to be at least approximately 1.5 mm in diameter for all numerical apertures less than 0.90.

It is noted, however, that the inspection system can still operate even though the inspection system is not configured such that all three parameters are maximized at their respective high numerical aperture and magnification and large field of view settings.

Figure 6:
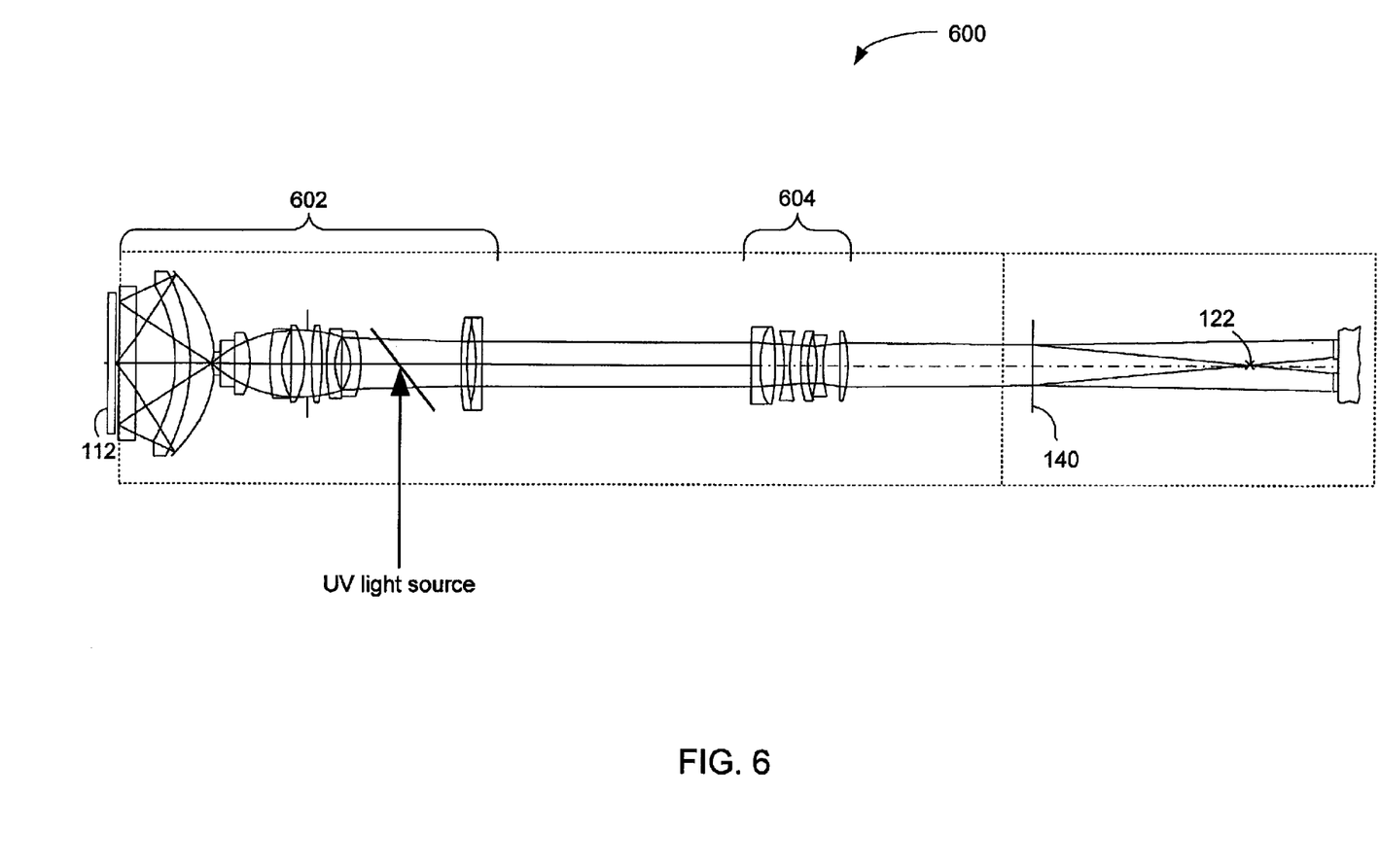
FIG. 6 illustrates an embodiment of the microscope inspection system that utilizes a catadioptric lens and a zoom lens.

The microscope inspection system can be formed of different lens combinations from the combination as shown in FIG. 1. For example, an alternative embodiment of inspection system 100 need not use a zoom lens, but can instead use a set of fixed magnification lenses (commonly called tube lenses in microscope systems) to create a range of magnifications. In another embodiment, a catadioptric lens can be used by itself with a zoom, but no pupil relay lens system. Another embodiment of the invention can utilize an objective lens by itself, in combination with the multiple detector arrays. In yet another alternative embodiment the reimaging lens section need not be included such that only the catadioptric lens section and the zoom lens section are used in combination. This embodiment is illustrated in FIG. 6 wherein inspection system 600 utilizes catadioptric objective lens 602 and a zoom lens 604. Finally, one could use multiple catadioptric objectives each with its own tube lens and pupil relay for each magnification or multiple catadioptric objectives with its own tube lens and no pupil relay for each magnification. The common goal for each of the various embodiments is to have a field of view large enough to accept more than one detector array.

In each of the embodiments described above, a lithographic type objective lens or any other suitable microscope objective lens that provides a high-quality and large field of view can equally substitute for the catadioptric objective lens.

Detector section 104 includes multiple detector arrays 116 used to detect the light rays traveling from the specimen and through the various lenses. Detector arrays 116 are positioned within the field of view of the inspection system. Detector arrays 116 can be placed directly in the line of the light rays, or as shown in FIG. 1, they can be placed in various locations within the inspection system so long as a reflective element 118 is used to re-direct the light rays towards the detector arrays 116. In FIG. 1, one detector array is positioned to receive light from a single, respective bundle of light. In alternative embodiments, more than one detector array can be positioned to receive light from a single bundle. In these alternative embodiments, it is a goal to use a large number of detector arrays so that the inspection system throughput can be increased.

Referring to FIG. 1, reflective element 118 is used to direct the bundles of light that pass through exit pupil 120 towards each of respective detector arrays 116. Reflective element 118 has reflective surfaces oriented in various planes such that detector arrays 116 can be placed in respectively different orientations. In FIG. 1, reflective element 118 is shaped like a pyramid and has reflective surfaces to redirect the light rays from the exit pupil towards detector arrays 116.

Reflective element 118 is useful in that detector arrays 116 can be set physically apart from each other in the inspection system 100. Typically, detector arrays are attached to relatively larger printed-circuit boards that contain amplifiers, digitizers, and various types of circuitry required for integrating the detector's signal into the inspection system's image-processing computer. Because of the bulk of the components that are required to be adjacent to the detectors, they cannot easily be placed adjacent to each other in a configuration in which all of the detector arrays can fit within the field of view. Therefore, reflective element 118 relieves a system designer of the requirement to position the detector arrays physically adjacent to each other. Instead, reflective element 118 allows the detector arrays to be placed in various locations about the system that are more convenient while still being within the field of view.

Reflective element 118 should set apart from exit pupil 120 such that element 118 is beyond a split point 122. Split point 122 is the point at which the bundles of light that pass through exit pupil 120 completely cross over and separate from each other. Beyond the split point 122, the bundles of light can be separately directed towards respective detector arrays 116 by reflective element 118. Generally, reflective element 118 is placed somewhat beyond split point 122 to provide room for edge bevel and edge polishing effects, which affect the mirror's flatness.

Figure 2:
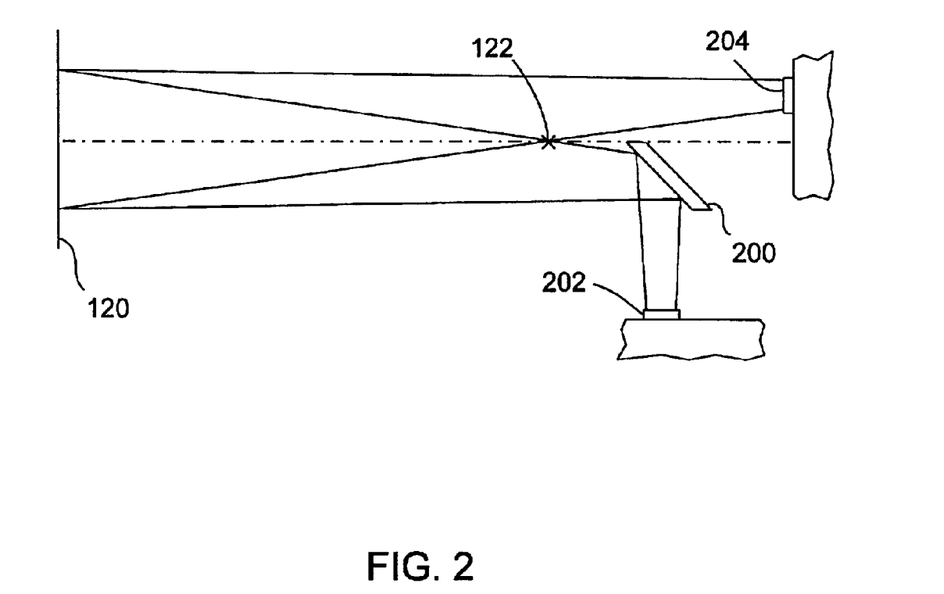
FIG. 2 illustrates a detector section according to an alternative embodiment of the present invention.
Figure 3:
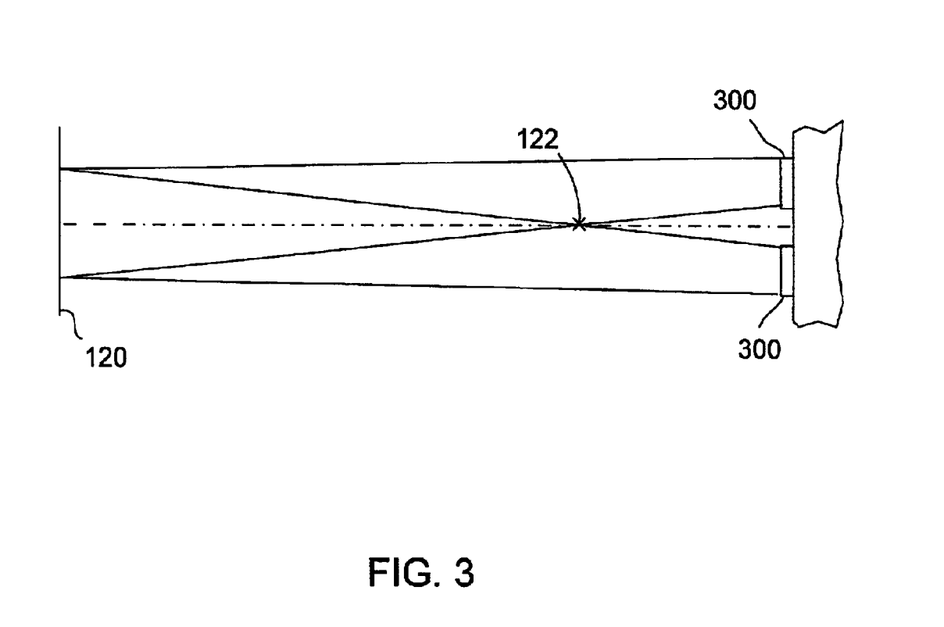
FIG. 3 illustrates a detector section according to an alternative embodiment of the present invention where no reflective element is used.

In alternative embodiments, variously shaped reflective elements can be used. In turn, the detector arrays can be placed in various locations throughout the detector section 104. Also, the number of reflective elements and detector arrays can vary. FIGS. 2 and 3 illustrate alternative embodiments of detector section 104.

FIG. 2 illustrates a detector section according to an alternative embodiment of the present invention. FIG. 2 is an embodiment of the invention that shows that some, but not necessarily all, of the separate bundles of light can be re-directed by a reflective element. In FIG. 2, reflective element 200 reflects light towards a detector array 202 that is oriented at approximately a 90-degree angle from detector array 204. Detector array 204 receives light directly from the exit pupil 120 without the aid of a reflective element.

FIG. 3 illustrates a detector section according to an alternative embodiment of the present invention where no reflective element is used. Detector arrays 300 are placed in a plane that is set apart from the exit pupil 120. The configuration shown in FIG. 3 assumes that it is possible to place detector arrays 300 close enough to each other that they both fit, at least partially, within the field of view. Detector arrays 300 are also placed beyond split point 122 so that each detector array receives light from only one bundle of light.

Figure 4:
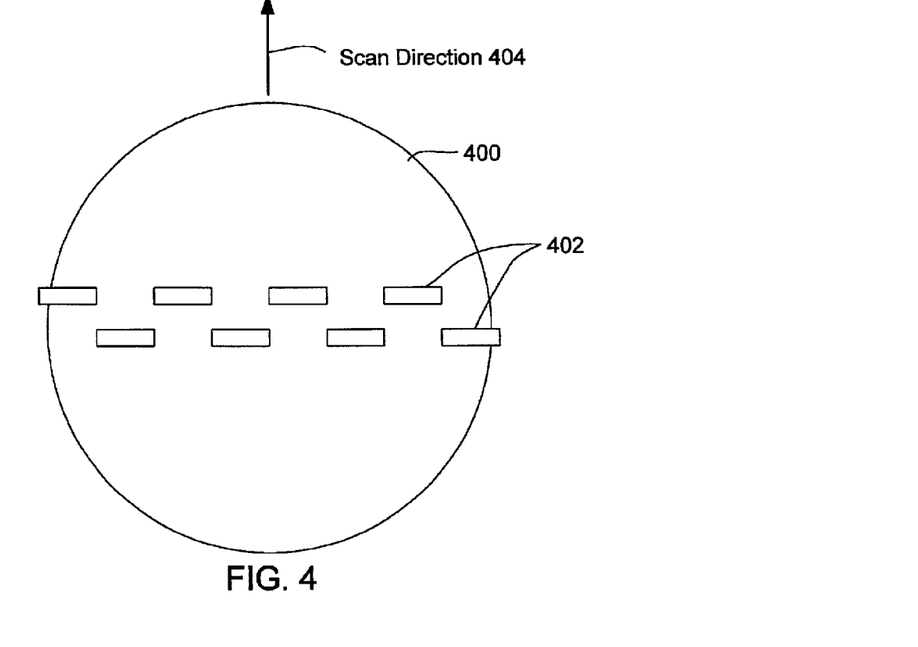
FIGS. 4 and 5 illustrate in a diagrammatic manner how the larger field of view of the present invention encompass more than one detector array.
Figure 5:
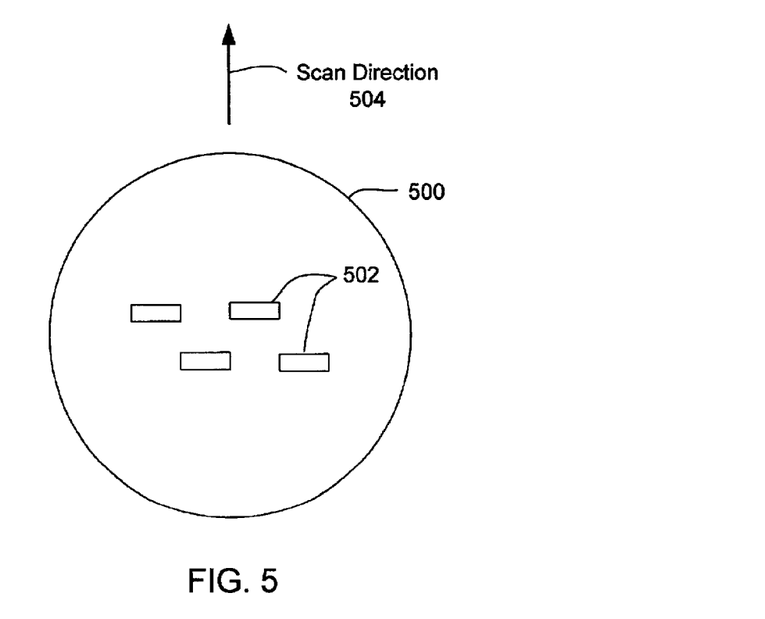

FIGS. 4 and 5 illustrate in a diagrammatic manner how the larger field of view of the present invention encompass more than one detector array. As discussed previously, the ability to place more than one detector array within the field of view allows inspection systems to operate at higher throughput rates. FIG. 4 illustrates a field of view 400 that substantially encompasses eight detector arrays 402. FIG. 5 illustrates a field of view 500 that substantially encompasses four detector arrays 502. The number of detector arrays that can fit within the field of view depends upon, among various factors, the magnification of the microscope inspection system, the size of the detectors, and the specific lenses used within the inspection system. Generally, more detector arrays can fit within the field of view as the magnification of the system increases. For instance, when comparing FIGS. 4 and 5, the magnification of the inspection system represented in FIG. 4 may be higher than that of FIG. 5 or the detectors of FIG. 4 may be smaller than that of FIG. 5, or a combination of both factors. At the same level of magnification, larger fields of view with a higher number of detector arrays generally increase the throughput rate of an inspection system since more area of the wafers can be inspected during each pass of the detector arrays over the wafers.

In FIG. 4, the two detector arrays 402 on the outer edges of the field of view 400 fall only partially within field of view 400. The two outermost detector arrays in FIG. 4 are only partially utilized in the inspection process however even their partial utilization can increase the throughput of the inspection system. In other words, it is not necessary for detector arrays to be completely encompassed within a field of view to be effective. For example, an inspection system can beneficially utilize 1.5 or 3.75 detector arrays in an inspection process.

Within fields of view 400 and 500, detector arrays 402 and 502 are aligned parallel to a common axis and in a staggered configuration. The detector arrays are aligned so that they are positioned substantially in an end-to-end formation in the axis of alignment. The detector arrays overlap each other slightly in an axis perpendicular to the scan direction 404 and 504 to ensure that no measurement gaps exist between the detector arrays while data is obtained from the wafer.

Preferably, an arrangement of the detector arrays allows an entire width of the field of view to be fully inspected during a scanning swath to maximize the area of a specimen examined. Therefore, it is desirable to have at least one detector array covering each portion of an axis that is perpendicular to the scanning axis. It is also preferable that the detector arrays are located across the widest portion of the field of view. In other words, For instance, to detectors 402 completely cover an axis that is perpendicular to scanning axis 400. Note that the location of individual detector arrays 402 with respect to the scanning direction axis 404 is not critical, so long as each detector is at least partially within field of view 400. In other words, if scanning direction axis 404 equates to a y-axis and the axis that runs across the width of field of view 400 equates to the x-axis, there is a detector array 402 at every position along the x-axis. Also, in these terms, the exact position of detector arrays 402 along the y-axis is not critical.

Inspection system embodiments that do not use a reflective element to split the rays going to the detector arrays (e.g., FIG. 3) have detector arrays that are physically positioned proximate to each other in the configurations shown in FIGS. 4 and 5. On the other hand, in embodiments that use reflective elements to split the rays going to the detector arrays, the detector arrays appear in the field of view as shown in FIGS. 4 and 5 even though the detector arrays are not physically proximate to each other. For instance, in FIG. 1, detector arrays 116 are actually on opposite sides of reflective element 118. As discussed earlier, reflective elements allow the detector arrays to be positioned apart from each other. In embodiments of the invention that use a reflective element, the detector arrays can be made to appear within the field of view to be aligned along a single, straight axis. For example, the top 4 detector arrays shown in FIG. 4 are the detector arrays 204 shown in FIG. 2 and the bottom 4 detector arrays in FIG. 4 are the detector arrays 202 shown in FIG. 2.

As described above, the combination of utilizing more than one detector array during inspection processes and a large field of view allows the inspection system to view and inspect a larger surface area of the specimen. This is advantageous in terms of reducing the time required for inspection processes. However, the large field of view increases the chances that uneven surfaces of a specimen will cause some portions of the specimen to be in focus while other portions to be out of focus. For example, semiconductor wafer surfaces typically have wedges that cause the wafer surfaces not to be substantially plane parallel. The wafers are mounted to vacuum chucks whose surface plane is nominally perpendicular to the inspection system's optical axis. In the instance of a wedged wafer, the wafer's surface would then be tilted relative to the optical axis. To compensate for the uneven specimen surfaces within the field of view, the stage (or chuck) that supports the wafer can be tilted so that the surface beneath the field of view is in focus with respect to each of the detector arrays. The specimen stage or the chuck can be tilted and rotated using a variety of mechanisms such as screws, gimbals, and flexures. The process of tilting the specimen stage can be automated such that the stage is adjusted once, continuously, or periodically as the inspection system is scanned over the surface of the specimen.

An alternative method maintaining focus throughout the entire field of view is to physically adjust each detector array until each one is in focus. This process can also be automated such that each of the detector arrays is adjusted once, continuously, or periodically during an inspection process.

Lens section 102 of FIG. 1 has broadband capabilities and therefore can be used with various lighting methods such as, but not limited to, deep ultraviolet lighting or visible lighting methods. The pupil plane 114 and illumination pupil 105 respectively, can be manipulated so that optical system 100 operates in various test modes. These test modes include, but are not limited to brightfield, ring darkfield, low-sigma, and full-sky illumination. For more detail regarding the lens section 102, refer to U.S. patent application Ser. No. 09/602,920 entitled "Lens For Microscopic Inspection" now U.S. Pat. No. 6,362,923B1.

The inspection system can be focused on the wafer using the technique of blue auto focusing. Blue auto focusing refers to a subsystem used to automatically focusing the inspection system using wavelengths that are proximate to the broadband spectrum of the inspection system and uses the same objective lens and operates within the field of view of the detector arrays. In this instance, the broadband inspection system's upper wavelength is 370 nm and the autofocus wavelength can be just above this, say about 400 nm with special coatings on the lens surfaces that would reject this wavelength from reaching the TDI detectors, but travel to the sensors for the autofocus subsystem.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. A microscope inspection apparatus for inspecting a specimen comprising:
    an objective lens having high magnification and a first end positioned proximate to the specimen;
    a field of view of the microscope inspection apparatus; and
    more than one detector array positioned substantially within the field of view.

2. A microscope inspection apparatus as recited in claim 1 wherein the magnification power of the objective lens is at least approximately 40×.

3. A microscope inspection apparatus as recited in claim 1 wherein the objective lens is configured to have a high numerical aperture.

4. A microscope inspection apparatus as recited in claim 3 wherein the numerical aperture is at least approximately 0.45.

5. A microscope inspection apparatus as recited in claim 1 wherein the inspection apparatus can achieve a resolution of approximately 0.5 $\mu$m or less.

6. A microscope inspection apparatus as recited in claim 1 wherein the objective lens is a catadioptric lens.

7. A microscope inspection apparatus as recited in claim 1 further comprising:
    a reimaging lens having a first end that is positioned proximate to a second end of the objective lens, the second end of the objective lens being opposite to the first end of the objective lens.

8. A microscope inspection apparatus as recited in claim 7 further comprising:
    a zoom lens that is positioned proximate to a second end of the reimaging lens, the second end of the reimaging lens being opposite to the first end of the reimaging lens, the zoom lens configured to zoom or change the magnification of the microscope inspection apparatus.

9. A microscope inspection apparatus as recited in claim 1 further comprising:
    a zoom lens that is positioned proximate to a second end of the objective lens that is opposite to the first end of the objective lens, the zoom lens configured to zoom or change the magnification of the microscope inspection apparatus.

10. A microscope inspection apparatus as recited in claim 1 further comprising:
    a tube lens that is positioned proximate to a second end of the objective lens that is opposite to the first end of the objective lens.

11. A microscope inspection apparatus as recited in claim 1 wherein a split point refers to the point at which light emanating from the objective lens completely separates into two individual bundles of light, the inspection apparatus further comprising:
    a reflective element positioned between the objective lens and the detector arrays, the reflective element configured to direct at least one of the bundles of light towards one of the detector arrays, wherein the reflective element is positioned on the side of the split point that is opposite from the objective lens.

12. A microscope inspection apparatus as recited in claim 11 wherein the reflective element directs light in two opposite directions and wherein two respective detector arrays are configured to receive the light from the reflective element.

13. A microscope inspection apparatus as recited in claim 1 wherein a split point refers to the point at which light emanating from the objective lens completely separates into two individual bundles of light, and wherein two detector array are positioned such that each detector array receives light from a respective bundle of light.

14. A microscope inspection apparatus as recited in claim 1 wherein the objective lens is made completely of refractive materials.

15. A microscope inspection apparatus as recited in claim 1 wherein the field of view is aligned with a two axis coordinate system wherein the first and second axis are orthogonal to each other and the first axis is parallel to the scanning direction of inspection apparatus, and wherein at least one detector array lies within each and every position along the second axis regardless of the detector array's position along the first axis.

16. A microscope inspection apparatus as recited in claim 1 further comprising a light source for directing light into the inspection apparatus and illuminating a portion of the specimen, wherein the light source is of a type selected from a group consisting of a continuous wave laser, a pulsed laser, and an arc lamp.

17. A microscope inspection apparatus as recited in claim 1 further comprising:
   a chuck for supporting the specimen; and
   a tilting device for tilting the chuck during inspection so that substantially all of the specimen within the field of view is in focus with respect to each of the detector arrays.

18. A microscope inspection apparatus as recited in claim 1 further comprising:
   at least one adjusting device configured to adjust the position of a respective detector array so that the detector array can be moved into focus with respect to an inspected portion of the specimen.

19. A microscope inspection apparatus as recited in claim 1 wherein a surface of the specimen is brought to focus on each detector array.

20. A microscope inspection apparatus as recited in claim 1 wherein the microscope inspection apparatus generates a bright field image of the specimen.

21. A microscope inspection apparatus as recited in claim 1 wherein the microscope inspection apparatus generates a dark field image of the specimen.

22. A microscope inspection apparatus as recited in claim 1 further comprising:
   a deep ultraviolet light source or a broadband, deep ultraviolet light source configured to illuminate the specimen.

23. A microscope inspection apparatus as recited in claim 1 further comprising:
   a narrowband ultraviolet light source configured to illuminate the specimen.

24. A microscope inspection apparatus as recited in claim 1 further comprising:
   a reflective element positioned between the objective lens and the detector arrays, the reflective element configured to direct the light emanating from the objective lens in two or more directions, wherein respective detector arrays are configured to receive the light from the reflective element.

25. A microscope inspection apparatus for inspecting a semiconductor wafer comprising:
   a catadioptric objective lens configured to have a high magnification, a high numerical aperture, and a large field of view, a first end of the objective lens positioned proximate to the semiconductor wafer;
   a reimaging lens positioned adjacent to the catadioptric objective lens;
   a zoom lens that is positioned proximate to the reimaging lens, the reimaging lens positioned in between the zoom lens and the objective lens;
   a split point being the point at which light emanating from the zoom lens completely separates into two individual bundles of light; and
   more than one detector array positioned substantially within the field of view of the microscope inspection apparatus and configured to receive light from each of the individual bundles of light.

26. A microscope inspection apparatus as recited in claim 25 further comprising:
   a reflective element positioned between the split point and the detector arrays, the reflective element configured to direct at least one of the bundles of light towards one of the detector arrays.

27. A microscope inspection apparatus as recited in claim 25 wherein the inspection apparatus can achieve a resolution of approximately 0.5 $\mu$m or less.

28. A microscope inspection apparatus as recited in claim 25 wherein the field of view is aligned with a two axis coordinate system wherein the first and second axis are orthogonal to each other and the first axis is parallel to the scanning direction of inspection apparatus, and wherein at least one detector array lies within each and every position along the second axis regardless of the detector array's position along the first axis.

29. A microscope inspection apparatus as recited in claim 25 further comprising:
   at least one adjusting device configured to adjust the position of a respective detector array so that the detector array can be moved into focus with respect to an inspected portion of the semiconductor wafer.

30. A microscope inspection apparatus for inspecting a specimen comprising:
   a objective lens configured to have a large field of view, a first end of the objective lens positioned proximate to the specimen;
   a split point being the point at which light emanating from the objective lens completely separates into two individual bundles of light;
   more than one detector array positioned substantially within the field of view of the microscope inspection apparatus and configured to receive light from each of the individual bundles of light; and
   a reflective element positioned between the split point and the detector arrays, the reflective element configured to direct at least one of the bundles of light towards one of the detector arrays.

31. A microscope inspection apparatus as recited in claim 30 wherein the inspection apparatus can achieve a resolution of approximately 0.5 $\mu$m or less.

32. A microscope inspection apparatus as recited in claim 30 wherein the field of view is aligned with a two axis coordinate system wherein the first and second axis are orthogonal to each other and the first axis is parallel to the scanning direction of inspection apparatus, and wherein at least one detector array lies within each and every position along the second axis regardless of the detector array's position along the first axis.

33. A microscope inspection system for use in a semiconductor manufacturing process comprising:
   a semiconductor wafer;
   an objective lens having high magnification and a first end positioned proximate to the semiconductor wafer;
   a field of view of the microscope inspection system; and
   more than one detector array positioned substantially within the field of view.

34. A microscope inspection system as recited in claim 33 wherein the objective lens is configured to have a high numerical aperture.

35. A microscope inspection system as recited in claim 33 wherein the microscope inspection system can achieve a resolution of approximately 0.5 µm or less.

36. A microscope inspection system as recited in claim 33 wherein a split point refers to the point at which light emanating from the objective lens completely separates into two individual bundles of light, the microscope inspection system further comprising:

a reflective element positioned between the objective lens and the detector arrays, the reflective element configured to direct at least one of the bundles of light towards one of the detector arrays, wherein the reflective element is positioned on the side of the split point that is opposite from the objective lens.

37. A microscope inspection system as recited in claim 33 wherein a surface of the semiconductor wafer is brought to focus on each detector array.

38. A microscope inspection system as recited in claim 33 wherein the microscope inspection system generates a bright field image or a dark field image of the specimen.

39. A microscope inspection system as recited in claim 33 further comprising:

a deep ultraviolet light source or a broadband, deep ultraviolet light source configured to illuminate the semiconductor wafer.

40. A microscope inspection system as recited in claim 33 further comprising:

a narrowband ultraviolet light source configured to illuminate the semiconductor wafer.

41. A method for inspecting semiconductor wafers using a microscope inspection apparatus comprising:

securing a semiconductor wafer to a chuck;

positioning a first end of an objective lens proximate to a surface of the semiconductor wafer, wherein the objective lens is configured to have high magnification;

positioning more than one detector array substantially within a field of view of the microscope inspection apparatus;

scanning the objective lens over the semiconductor wafer; and processing information collected from the microscope inspection apparatus during the scanning operation.

42. A method as recited in claim 41 wherein the objective lens is configured to have a magnification of at least approximately 40×.

43. A method as recited in claim 41 wherein the objective lens is configured to have a numerical aperture of at least approximately 0.45.

44. A method as recited in claim 41 wherein the microscope inspection system can achieve a resolution of approximately 0.5 µm or less.

45. A method as recited in claim 41 wherein a split point refers to the point at which light emanating from the objective lens completely separates into two individual bundles of light, the method further comprising:

positioning a reflective element between the objective lens and the detector arrays at a position that is on the side of the split point opposite from the objective lens; and using the reflective element to direct at least one of the bundles of light towards one of the detector arrays.

46. A method as recited in claim 41 further comprising:

focusing a surface of the semiconductor wafer upon each detector array.

47. A method as recited in claim 41 further comprising:

generating a bright field image or a dark field image of the semiconductor wafer.

48. A method as recited in claim 41 further comprising:

illuminating the semiconductor wafer using a deep ultraviolet light source or a broadband, deep ultraviolet light source.

49. A method as recited in claim 41 further comprising:

illuminating the semiconductor wafer using a narrowband, ultraviolet light source.

* * * * *